US010455599B2

(12) United States Patent
Seo et al.

(10) Patent No.: US 10,455,599 B2
(45) Date of Patent: *Oct. 22, 2019

(54) METHOD FOR TRANSMITTING CONTROL INFORMATION AND APPARATUS FOR SAME

(71) Applicant: LG ELECTRONICS INC., Seoul (KR)

(72) Inventors: Hanbyul Seo, Anyang-si (KR); Hakseong Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 18 days.

This patent is subject to a terminal disclaimer.

(21) Appl. No.: 15/714,840

(22) Filed: Sep. 25, 2017

(65) Prior Publication Data
US 2018/0014315 A1 Jan. 11, 2018

Related U.S. Application Data

(63) Continuation of application No. 14/384,628, filed as application No. PCT/KR2013/001975 on Mar. 12, 2013, now Pat. No. 9,801,196.

(60) Provisional application No. 61/609,367, filed on Mar. 12, 2012, provisional application No. 61/752,433, filed on Jan. 14, 2013.

(51) Int. Cl.
*H04W 72/12* (2009.01)
*H04L 1/18* (2006.01)

(52) U.S. Cl.
CPC .......... *H04W 72/12* (2013.01); *H04L 1/1822* (2013.01); *H04L 1/1861* (2013.01)

(58) Field of Classification Search
CPC . H04W 72/00; H04W 72/02; H04W 72/0406; H04W 24/10; H04L 1/1861; H04L 1/1812; H04L 1/1854; H04L 1/1822
See application file for complete search history.

(56) References Cited

U.S. PATENT DOCUMENTS 8,599,782 B2 * 12/2013 Chung ................. H04L 1/1812
370/315
8,797,896 B2 * 8/2014 Li ..................... H04B 7/15542
370/252

(Continued)

FOREIGN PATENT DOCUMENTS

KR 1020090078723 7/2009
KR 1020100134024 12/2010

(Continued)

*Primary Examiner* — Min Jung
(74) *Attorney, Agent, or Firm* — Dentons US LLP

(57) ABSTRACT

The present invention relates to a wireless communication system. More specifically, the present invention relates to a method for carrying out HARQ action from a terminal operating in one of a plurality of link types, and to an apparatus for same, the method comprising the steps of: a first subframe (SF) receiving scheduling information; a second SF receiving data according to the scheduling information; and a third SF transmitting response information with respect to the data, wherein the first SF, the second SF, and the third SE correspond to a single HARQ process, a SF set which corresponds to the single HARQ process in a first link type comprises a plurality of SF subsets, and wherein each of the SF subsets corresponds to a single HARQ process in a second link type.

16 Claims, 14 Drawing Sheets

(56) References Cited

U.S. PATENT DOCUMENTS

| | | | | |
|---|---|---|---|---|
| 8,848,591 B2* | 9/2014 | Liu | ................. | H04W 4/06 |
| | | | | 370/312 |
| 9,258,086 B2* | 2/2016 | Chen | ................. | H04L 1/1854 |
| 9,801,196 B2* | 10/2017 | Seo | ................. | H04L 1/1822 |
| 2009/0307555 A1 | 12/2009 | Cai | ................. | H04L 1/1887 |
| | | | | 714/748 |
| 2011/0235586 A1 | 9/2011 | Han | ................. | H04B 7/0426 |
| | | | | 370/328 |
| 2011/0261746 A1* | 10/2011 | Seo | ................. | H04L 1/1812 |
| | | | | 370/315 |
| 2011/0310789 A1 | 12/2011 | Hu | ................. | H04L 5/0005 |
| | | | | 370/315 |
| 2012/0026963 A1* | 2/2012 | Kim | ................. | H04L 1/1812 |
| | | | | 370/329 |
| 2012/0076078 A1 | 3/2012 | Han | ................. | H04L 1/06 |
| | | | | 370/328 |
| 2012/0300692 A1 | 11/2012 | Sfar | ................. | H04B 7/15521 |
| | | | | 370/315 |
| 2013/0083736 A1* | 4/2013 | Yin | ................. | H04W 72/0446 |
| | | | | 370/329 |
| 2014/0078941 A1* | 3/2014 | Seo | ................. | H04L 1/1822 |
| | | | | 370/280 |
| 2014/0177491 A1 | 6/2014 | Hao | ................. | H04W 72/1278 |
| | | | | 370/280 |
| 2014/0241254 A1 | 8/2014 | Kaur | ................. | H04L 1/1812 |
| | | | | 370/329 |
| 2014/0241262 A1 | 8/2014 | Novak | ................. | H04W 72/042 |
| | | | | 370/329 |

FOREIGN PATENT DOCUMENTS

| | | |
|---|---|---|
| KR | 1020110103454 | 9/2011 |
| WO | 2011068589 | 6/2011 |
| WO | 2012024331 | 2/2012 |

* cited by examiner

METHOD FOR TRANSMITTING CONTROL INFORMATION AND APPARATUS FOR SAME

This application is a continuation application of U.S. patent application Ser. No. 14/384,628 filed Sep. 11, 2014, which is a National Stage Application of International Application No. PCT/KR2013/001975 filed Mar. 12, 2013, which claims priority to U.S. Provisional Application No. 61/609,367 filed Mar. 12, 2012 and U.S. Provisional Application No. 61/752,433 filed Jan. 14, 2013, all of which are incorporated by reference for all purposes as if fully set forth herein.

TECHNICAL FIELD

The present invention relates to a wireless communication system, and more particularly, to a method and apparatus for transmitting control information.

BACKGROUND ART

Wireless communication systems have been widely deployed in order to provide various types of communication services including voice or data. In general, a wireless communication system is a multiple access system that can support communication with multiple users by sharing available system resources (a bandwidth, transmission power, etc.). Examples of multiple access systems include code division multiple access (CDMA), frequency division multiple access (FDMA), time division multiple access (TDMA), orthogonal frequency division multiple access (OFDMA), single carrier frequency division multiple access (SC-FDMA), etc.

DISCLOSURE

Technical Problem

An object of the present invention devised to solve the problem lies in a method and apparatus for effectively transmitting control information in a wireless communication system. Another object of the present invention is to provide a method and apparatus for effectively transmitting control information and effectively managing a resource for the control information in a system that support user equipment (UE)-UE link.

It is to be understood that both the foregoing general description and the following detailed description of the present invention are exemplary and explanatory and are intended to provide further explanation of the invention as claimed.

Technical Solution

The object of the present invention can be achieved by providing a method for performing a hybrid automatic repeat request (HARQ) operation in a user equipment (UE) operating in one of a plurality of link types in a wireless communication system, the method including receiving scheduling information in a first subframe (SF), receiving data according to the scheduling information in a second SF, and transmitting response information to the data in a third SF, wherein the first SF, the second SF, and the third SF corresponds to one HARQ process, and an SF set corresponding to one HARQ process includes a plurality of SF subsets in a first link type, and each SF subset corresponds to one HARQ process in a second link type.

In another aspect of the present invention, provided herein is a user equipment (UE) configured to perform a hybrid automatic repeat request (HARQ) operation and to operate in one of a plurality of link types in a wireless communication system, the UE including a radio frequency (RF) unit, and a processor, wherein the processor is configured to receive scheduling information in a first subframe (SF), to receive data according to the scheduling information in a second SF, and to transmit response information to the data in a third SF, the first SF, the second SF, and the third SF corresponds to one HARQ process, and an SF set corresponding to one HARQ process includes a plurality of SF subsets in a first link type, and each SF subset corresponds to one HARQ process in a second link type.

The first link type may include link between the UE and a base station (BS), and the second link type may include link between the UE and another UE.

The scheduling information may be received from the BS, and the data may be received from the another UE, and the response information may be transmitted to the BS in the case of the second link type.

A period of an HARQ process may correspond to 8 subframes in the first link type, a period of an HARQ process may correspond to 8*k subframes in the second link type, and k is an integer equal to or greater than 2.

A period of an HARQ process may correspond to 8 subframes in the first link type, and a period of an HARQ process may correspond to 16 subframes in the second link type.

An interval between the second SF and the third SF may correspond to 4 subframes in the first link type, and an interval between the second SF and the third SF may correspond to 4 subframes in the second link type.

Advantageous Effects

According to the present invention, control information can be effectively transmitted in a wireless communication system. In detail, control information can be effectively transmitted and a resource for the control information can be effectively managed in a system that supports user equipment (UE)-UE link.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of evolved UMTS (E-UMTS) using E-UTRA. 3GPP LTE employs OFDMA for downlink and SC-FDMA for uplink. LTE-A is an evolution of 3GPP LTE.

For clarity, the following description focuses on 3GPP LTE/LTE-A. However, technical features of the present invention are not limited thereto. Specific terms used for the embodiments of the present invention are provided to help the understanding of the present invention. These specific terms may be replaced with other terms within the scope and spirit of the present invention.

Figure 1:
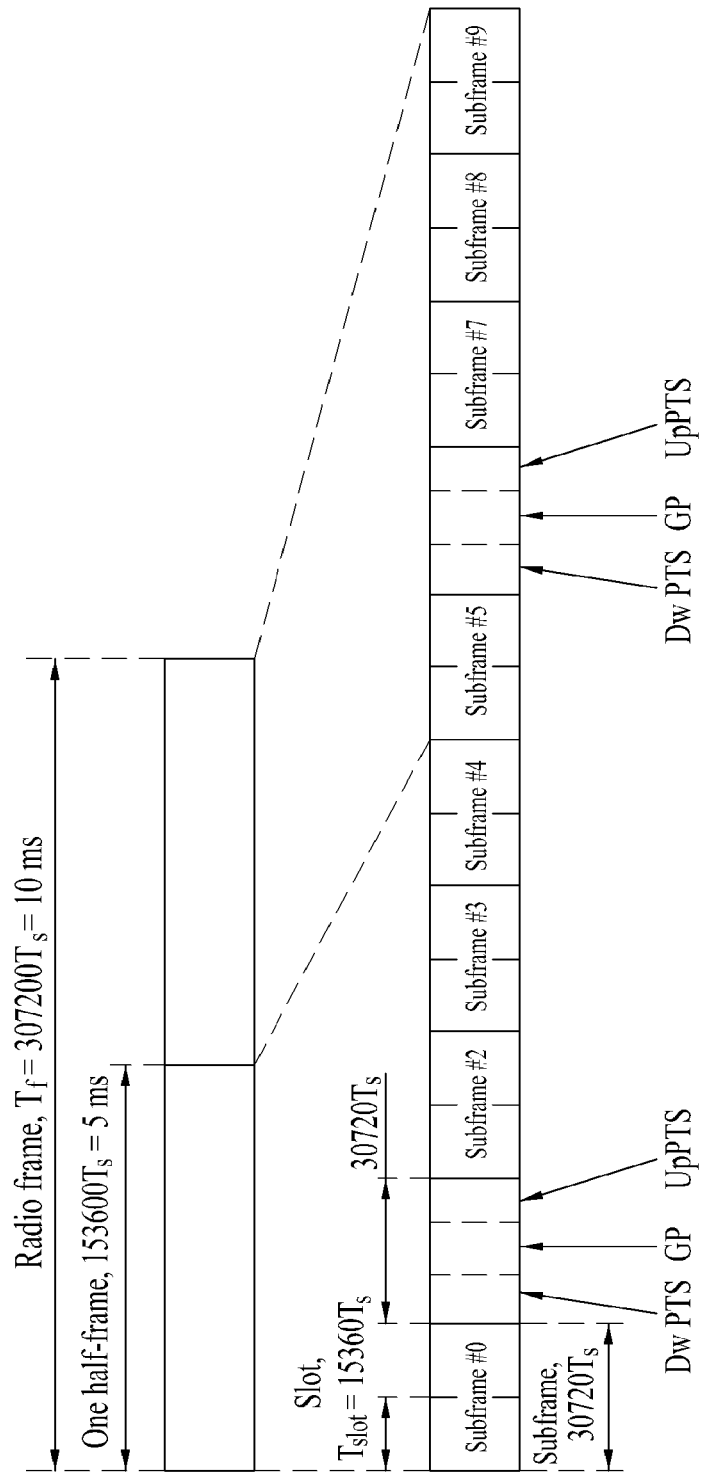
FIG. 1 illustrates a structure of a radio frame.

FIG. 1 illustrates a structure of a radio frame. Uplink and/or downlink data packets are transmitted in units of subframes. One subframe is defined as a predetermined time period including a plurality of OFDM symbols (or SC-FDMA symbols). LTE(-A) supports a type-1 radio frame structure applicable to frequency division duplex (FDD) and a type-2 radio frame structure applicable to time division duplex (TDD).

FIG. 1(*a*) illustrates the type-1 radio frame structure. A downlink/uplink radio frame is divided into 10 subframes. Each subframe is further divided into two slots in the time domain. For example, one subframe may be 1 ms in duration and one slot may be 0.5 ms in duration. A slot includes a plurality of OFDM symbols (or SC-FDMA symbols) in the time domain and a plurality of resource blocks (RBs) in the frequency domain. The LTE(-A) system adopts OFDMA for downlink and SC-FDMA for uplink. An RB is a resource allocation unit including a plurality of contiguous subcarriers in a slot.

The number of OFDM symbols in one slot may vary depending on a Cyclic Prefix (CP) configuration. For example, in the case of the normal CP, one slot includes 7 OFDM symbols. In the case of the extended CP, one slot includes 6 OFDM symbols.

FIG. 1(*b*) illustrates the type-2 radio frame structure. A type-2 radio frame includes two half frames, each having 5 subframes. One subframe includes two slots.

Table 1 shows a DL-UL configuration (UL-DL Cfg) of subframes within a radio frame, in a TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe and S denotes a special subframe. The special subframe includes Downlink Pilot TimeSlot (DwPTS), guard period (GP), and uplink pilot timeslot (UpPTS). DwPTS is a time slot reserved for DL transmission and UpPTS is a time slot reserved for UL transmission.

The above-described radio frame structure is purely exemplary and thus it is to be noted that the number of subframes in a radio frame, the number of slots in a subframe, or the number of symbols in a slot may vary.

Figure 2:
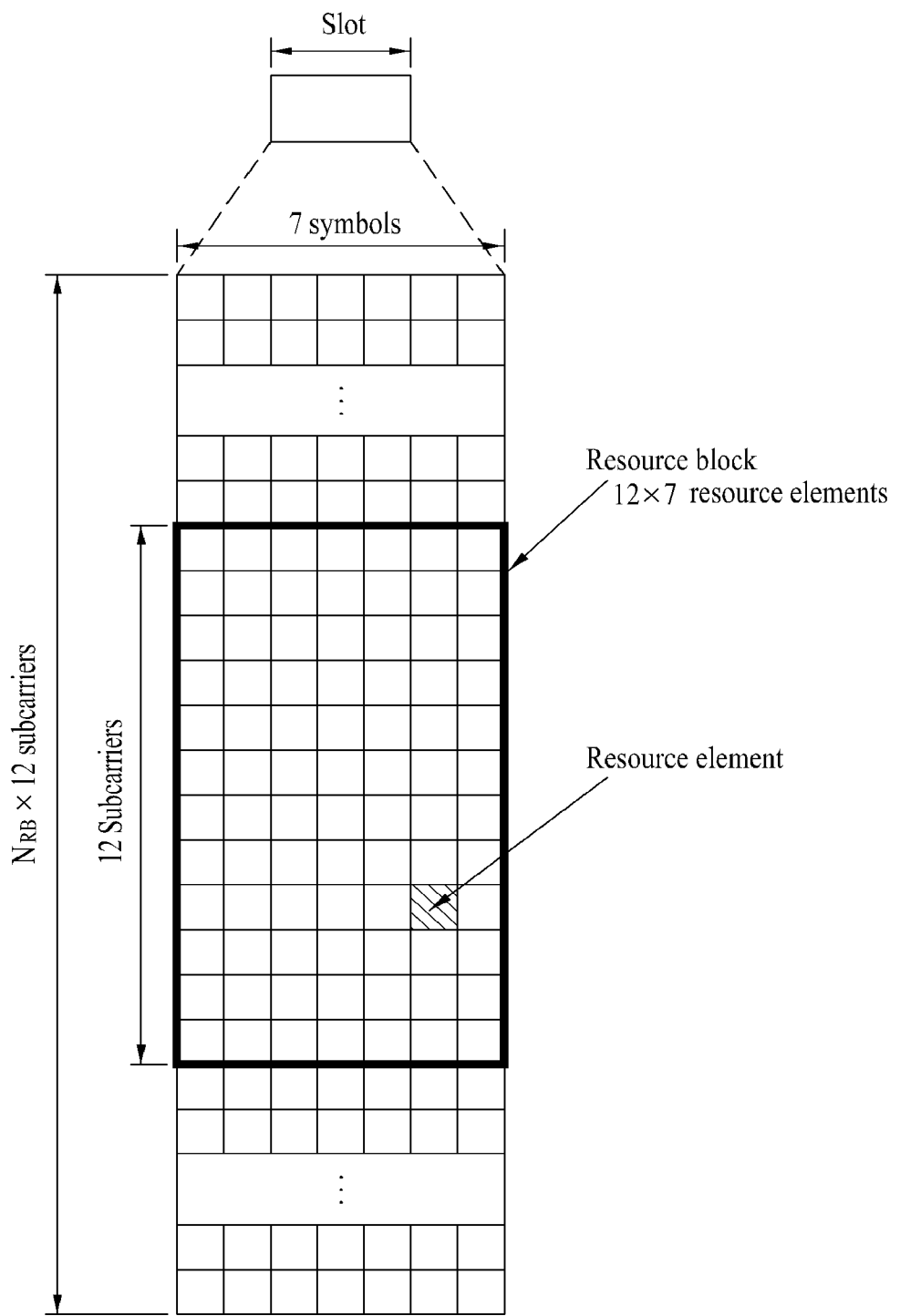
FIG. 2 illustrates a resource grid for one downlink (DL) slot.

FIG. 2 illustrates a resource grid for one DL slot.

Referring to FIG. 2, a DL slot includes a plurality of OFDM symbols in the time domain. One DL slot may include 7(6) OFDM symbols in the time domain and an RB may include 12 subcarriers in the frequency domain. Each element of the resource grid is referred to as a Resource Element (RE). An RB includes 12×7 REs. The number of RBs in a DL slot, $N_{RB}$ depends on a DL transmission bandwidth. A UL slot may have the same structure as a DL slot except that OFDM symbols are replaced with SC-FDMA symbols.

Figure 3:
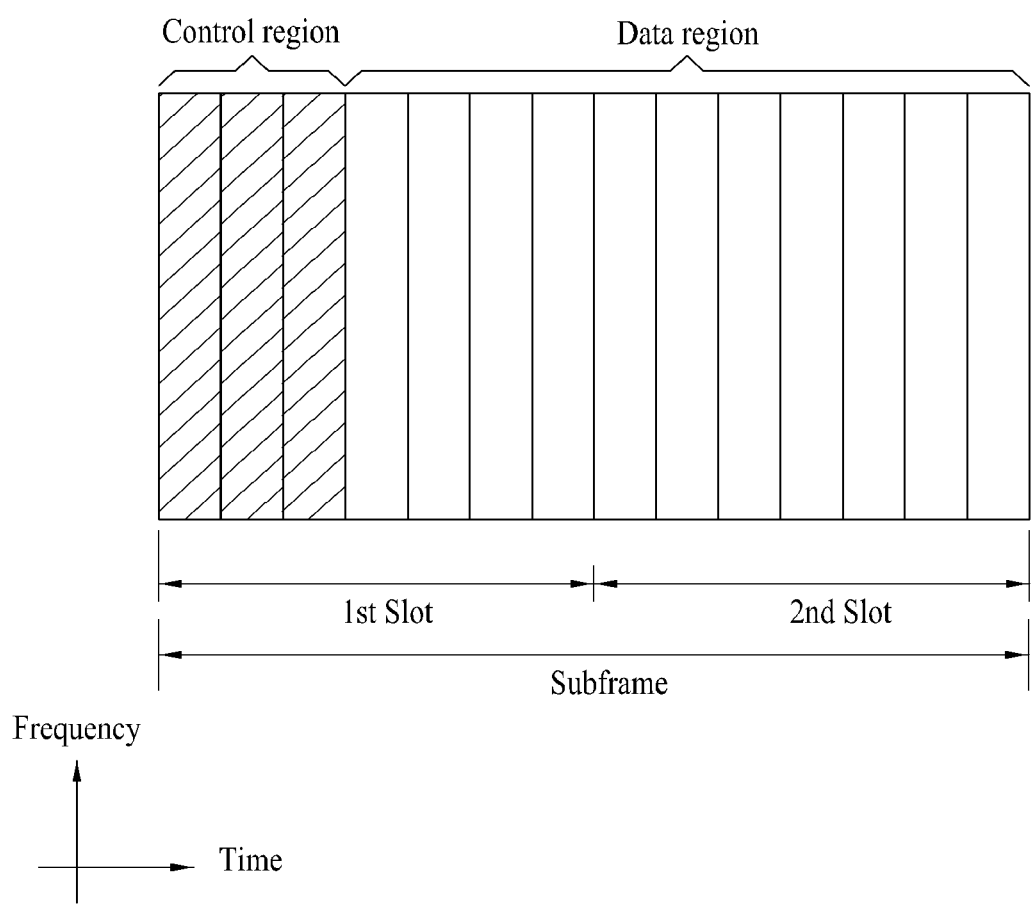
FIG. 3 illustrates a DL subframe structure.

FIG. 3 illustrates a DL subframe structure.

Referring to FIG. 3, up to 3 OFDM symbols at the start of the first slot of a DL subframe are used for a control region to which control channels are allocated. The other OFDM symbols of the DL subframe are used for a data region to which a physical downlink shared channel (PDSCH) is allocated. Examples of the DL control channel include physical control format indicator channel (PCFICH), physical downlink control channel (PDCCH), and physical hybrid automatic repeat request (HARQ) indicator channel (PHICH). The PCFICH is transmitted in the first OFDM symbol of a subframe, carrying information about the number of OFDM symbols used for transmission of control channels in the subframe. The PHICH delivers a hybrid automatic repeat request acknowledgment (HARQ-ACK) signal in response to a UL transmission. HARQ-ACK: which refers to a reception response result to uplink transmission (e.g., physical downlink shared channel (PDSCH)) or semi-persistent scheduling release physical downlink control channel (SPS release PDCCH), that is, acknowledgement(ACK)/negative (NACK)/discontinuous transmission(DTX) response (in brief, ACK/NACK response, ACK/NACK, A/N response, or A/N). The ACK/NACK response refers to ACK, NACK, DTX, or NACK/DTX. HARQ-ACK for CC or HARQ-ACK for CC refers to ACK/NACK response to DL transmission associated with the corresponding CC (e.g., scheduled for the corresponding CC). The PDSCH may be replaced with a transfer block or a codeword.

Control information transmitted on the PDCCH is called downlink control information (DCI). The DCI format is defined as Formats 0, 3, 3A, and 4 for UL and Formats 1, 1A, 1B, 1C, 1D, 2, 2A, 2B, and 2C for DL. The DCI format selectively includes information such as hopping flag, RB allocation, modulation coding scheme (MCS), redundancy version (RV), new data indicator (NDI), transmit power control (TPC), cyclic shift for demodulation reference signal (DMRS), channel quality information (CQI) request, HARQ process number, transmitted precoding matrix indicator (TPMI), precoding matrix indicator (PMI), etc. according to the usage of DCI format.

The PDCCH delivers information about resource allocation and a transport format for a downlink shared channel (DL-SCH), information about resource allocation for an uplink shared channel (UL-SCH), paging information of a paging channel (PCH), system information on the DL-SCH, information about resource allocation for a higher-layer control message such as a random access response transmitted on the PDSCH, a set of TPC commands for individual UEs of a UE group, transmission power control information, voice over internet protocol (VoIP) activation information, etc. A plurality of PDCCHs may be transmitted in the control region. A UE may monitor a plurality of PDCCHs. A PDCCH is transmitted in an aggregate of one or more contiguous control channel elements (CCEs). A CCE is a logical allocation unit used to provide a PDCCH at a coding rate based on the state of a radio channel. A CCE includes a plurality of RE Groups (REGs). The format of a PDCCH and the number of available bits for the PDCCH are determined according to the number of CCEs. An eNB determines a PDCCH format according to DCI transmitted to a UE and adds a cyclic redundancy check (CRC) to control information. The CRC is masked by an Identifier (ID) (e.g., radio network temporary identifier (RNTI)) according to the owner or usage of the PDCCH. For example, if the PDCCH is directed to a specific UE, its CRC may be masked by a Cell-RNTI (C-RNTI) of the UE. If the PDCCH is used for a paging message, the CRC of the PDCCH may be masked by a Paging Indicator Identifier (P-RNTI). If the PDCCH carries system information, particularly, a system information block (SIB), its CRC may be masked by a system information ID and a system Information RNTI (SI-RNTI). To indicate that the PDCCH carries a random access response in response to a random access preamble transmitted by a UE, its CRC may be masked by a random access-RNTI (RA-RNTI).

Figure 4:
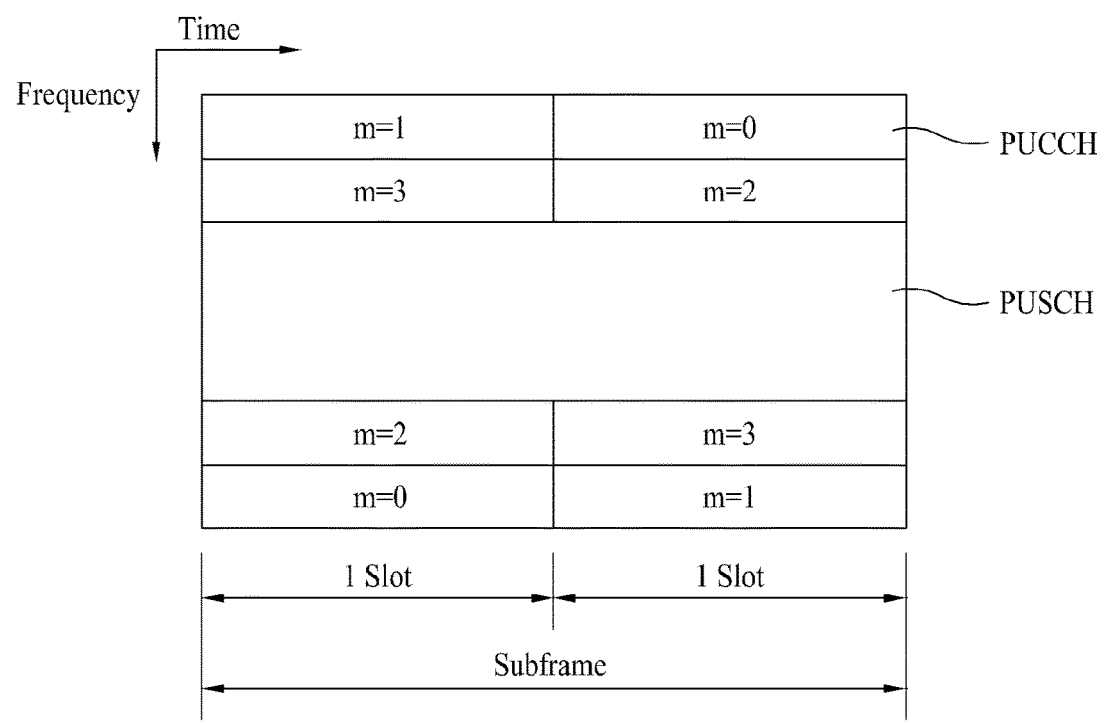
FIG. 4 illustrates a structure of a uplink (UL) subframe.

FIG. 4 illustrates a structure of a UL subframe used in LTE.

Referring to FIG. 4, a UL subframe includes a plurality of (e.g. 2) slots. A slot may include a different number of SC-FDMA symbols according to a CP length. The UL subframe is divided into a control region and a data region in the frequency domain. The data region includes a PUSCH to transmit a data signal such as voice. The control region includes a PUCCH to transmit UCI. The PUCCH occupies a pair of RBs at both ends of the data region on a frequency axis and the RB pair frequency-hops over a slot boundary.

The PUCCH may deliver the following control information.

Scheduling request (SR): information requesting UL-SCH resources. An SR is transmitted in on-off keying (OOK).

HARQ ACK/NACK: a response signal to a DL data packet received on a PDSCH, indicating whether the DL data packet has been received successfully. A 1-bit ACK/NACK is transmitted as a response to a single DL codeword and a 2-bit ACK/NACK is transmitted as a response to two DL codewords.

Channel quality indicator (CQI): feedback information regarding a DL channel. Multiple input multiple output (MIMO) related feedback information includes rank indicator (RI), precoding matrix indicator (PMI), precoding type indicator (PTI), etc. The CQI occupies 20 bits per subframe.

[Table 2] below shows a mapping relationship between PUCCH formats and UCI in LTE(-A).

TABLE 2

| PUCCH format | Uplink Control Information (UCI) |
|---|---|
| Format 1 | SR (non-modulated waveform) |
| Format 1a | 1-bit HARQ ACK/NACK (presence/absence of SR) |
| Format 1b | 2-bit HARQ ACK/NACK (presence/absence of SR) |
| Format 2 | CSI (20 coded bits) |
| Format 2 | CSI and 1-bit or 2-bit HARQ ACK/NACK (20 bits) (only in the case of extended CP) |
| Format 2a | CSI and 1-bit HARQ ACK/NACK (20 + 1 coded bits) |
| Format 2b | CSI and 2-bit HARQ ACK/NACK (20 + 2 coded bits) |
| Format 3 (LTE-A) | HARQ ACK/NACK + SR (48 bits) |

Since an LTE UE cannot simultaneously transmit PUCCH and PUSCH, when UCI (e.g., CQI/PMI, HARQ-ACK, RI, etc.) needs to be transmitted in a subframe in which the PUSCH is transmitted, the UCI is multiplexed in a PUSCH region (PUSCH piggyback). For LTE-A, a UE may also be configured in such as way that a UE cannot simultaneously transmit PUCCH and PUSCH. In this case, when UCI (e.g., CQI/PMI, HARQ-ACK, RI, etc.) needs to be transmitted in a subframe in which the PUSCH is transmitted, the UE may multiplex the UCI in a PUSCH region (PUSCH piggyback).

Figure 5:
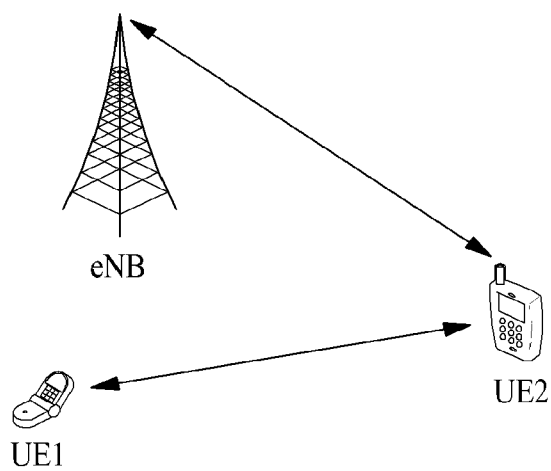
FIG. 5 illustrates an example of a wireless communication system that supports UE-UE communication/link.

FIG. 5 illustrates an example of a wireless communication system that supports UE-UE communication/link. UE-UE communication/link refers to UE-UE communication or link and is interchangeably used therewith. Referring to FIG. 5, a UE2 may communicate directly with a UE1 without passing a network (e.g., an eNB) (UE-UE communication/link). In addition, the UE2 may communicate directly with an eNB in a conventional manner (UE-eNB link/communication).

From an eNB point of view, UE-UE communication is new type of UL interference. Accordingly, in order to protect UE-eNB communication from interference caused by UE-UE communication, the eNB may have a function for adjusting UE-UE communication. For example, the eNB may schedule signal transfer between UEs and perform power control in UE-UE communication. To this end, UEs that participate in UE-UE communication may transmit required information (e.g., an ACK/NACK indicating whether UE signal reception is successful in UE-UE communication) to the eNB.

Hereinafter, the present invention proposes a method in which HARQ operations of two communications smoothly coexist when communication between a UE (e.g., UE2) and another UE (e.g., UE1) and communication between the UE and an eNB are simultaneously performed. According to the present invention, it is assumed that UE-UE communication and UE-eNB communication are performed at different points of time. For example, a signal that is transmitted from a specific UE to another UE and a signal that is transmitted from the corresponding specific UE to an eNB are transmitted at different points of time.

First, an HARQ process used in conventional UE-eNB communication will be described. A legacy LTE(-A) system uses synchronous HARQ in UL HARQ. Accordingly, a transmission/retransmission position in UL HARQ is predetermined and is not changed.

Figure 6:
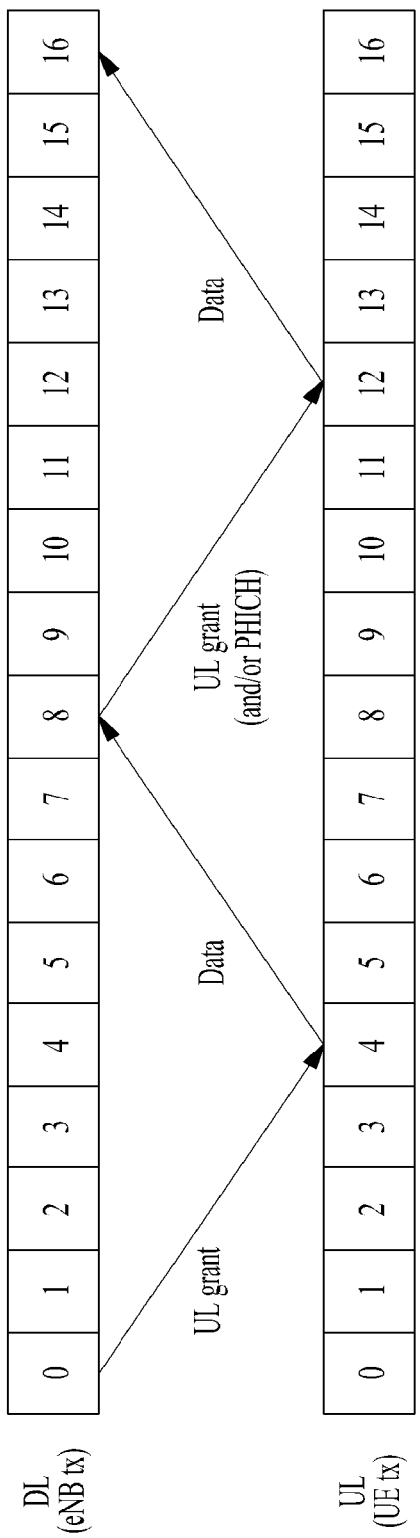
FIG. 6 illustrates a conventional hybric automatic repeat request (HARQ) operation in a frequency division duplex (FDD) system.

FIG. 6 illustrates a conventional HARQ operation in an FDD system. Referring to FIG. 6, one HARQ process performs a synchronous HARQ operation with a period of 8 ms. For example, when an eNB schedules PUSCH transmission through UL grant (UG) in subframe #0, a UE transmits the corresponding PUSCH in subframe #4. Scheduling for PUSCH retransmission or new PUSCH transmission that will use the corresponding HARQ process may be transmitted to the UE through UL grant (and/or PHICH) of subframe #8. As a result, UL HARQ has a retransmission period of 8 ms in FDD and thus there is a plurality of (e.g., 8) parallel HARQ processes. In the plurality of parallel HARQ processes, UL transmission may be contiguously performed while HARQ feedback to success or nonsuccess for previous UL transmission is expected. Each HARQ process is associated with an HARQ buffer of a medium access control (MAC) layer. Each HARQ process manages a state parameter of a transmission number of times of MACK physical data block (MAC PDU) in a buffer, HARQ feedback to the MAC PDU in the buffer, a redundancy version (RV), etc.

When an eNB schedules UE-UE communication, a different operation from a conventional HARQ operation is required. For example, when the eNB schedules UE-UE communication, the HARQ operation will now be sequentially described. First, when the eNB schedules signal transmission to a transmission UE and the transmission UE transmits a signal at a next point of time based on the scheduling result, a reception UE may report whether the signal is successfully received to the eNB through ACK/NACK at a next point of time. These points of time may be predetermined in a synchronous HARQ situation and as necessary, the eNB schedules retransmission of the corresponding signal based on this signal exchange. Assuming that a time interval of 4 ms is required between scheduling message transmission of an eNB and signal transmission of a UE, between ACK/NACK signal transmission and signal reception of the UE, and between retransmission scheduling and ACK/NACK signal reception of the eNB like in a conventional FDD system, an HARQ operation illustrated in FIG. 7 is possible.

Figure 7:
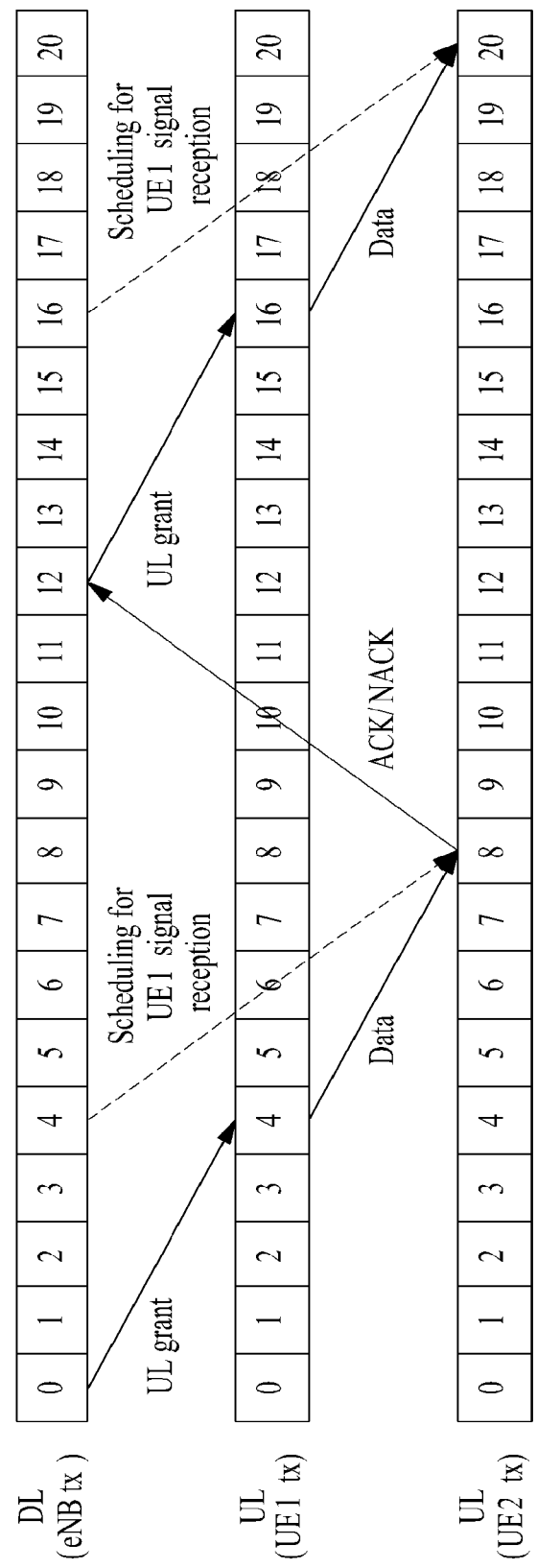
FIG. 7 illustrates a problem when a plurality of link types of HARQ operations coexist.

FIG. 7 illustrates a conventional HARQ operation when an eNB schedules UE-UE communication.

Referring to FIG. 7, the eNB may schedule [UE1=>UE2 signal transmission] to the UE1 in subframe #0. For convenience, in this example, it is assumed that signal transmission between UEs is scheduled using UL grant. According to scheduling, the UE1 transmits a signal to the UE2 in subframe #4 and the UE2 transmits an ACK/NACK signal to the eNB in subframe #8. In this case, as indicated by dotted line arrows, the eNB may transmit scheduling-related information to the UE2 in subframe #4 such that the UE2 receives a signal of the UE1. Based on an ACK/NACK signal of subframe #8, the eNB may schedule retransmission of a corresponding signal in subframe #12 or new transmission. According to the exemplary operation, in UE-UE communication, an HARQ process has a retransmission period of 12 ms.

Meanwhile, when UE-eNB communication has an HARQ (retransmission) period of 8 ms (FIG. 6) and UE-UE communication has an HARQ period (FIG. 7), since the HARQ periods of UE-eNB communication and UE-UE communication are mismatched, a problem may occur in terms of coexistence. For example, when the HARQ process of FIG. 7 is used in UE-UE communication, two of 8 HARQ processes cannot be used in UE-eNB communication. For description, it is assumed that HARQ process #n is defined as a process for transmitting UL grant in a subframe. Here, n is a remainder obtained by dividing an index of the corresponding subframe by 8. In this case, referring to FIG. 7, the eNB uses subframes #0, #12, #24, #36, . . . in UE-UE communication, and thus, HARQ processes #0 and #4 cannot be used in UE-eNB communication.

In this case, referring to FIG. 7, the eNB does not transmit UL grant for UE-eNB communication to the UE1 in subframe #4 corresponding to HARQ process #4 because the eNB needs to transmit UL grant for UE-UE communication in subframe #12 that belongs to HARQ process #4. In addition, the UE1 does not transmit a signal to the UE2 in subframe #8 corresponding to HARQ process #0 because the UE2 transmits an ACK/NACK signal in subframe #8 and thus cannot receive a signal of the UE1. Accordingly, there is a limit in using a subframe that is not used in UE-UE communication for UE-eNB communication.

In order to overcome this problem, the present invention proposes a method for adjusting an HARQ (retransmission) period of UE-UE communication. As one method, an HARQ period of UE-UE communication may be configured as a multiple (e.g., a multiple of 8 ms in the case of LTE(-A) FDD) of an HARQ period of UE-eNB communication. In this case, a subframe in which the eNB schedules UE-UE communication may be configured as a subframe that belongs to one UE-eNB HARQ process. In addition, a subframe that is difficult to use in UE-UE communication and UE-eNB communication in the example of FIG. 7 may be used in UE-UE communication.

Figure 8:
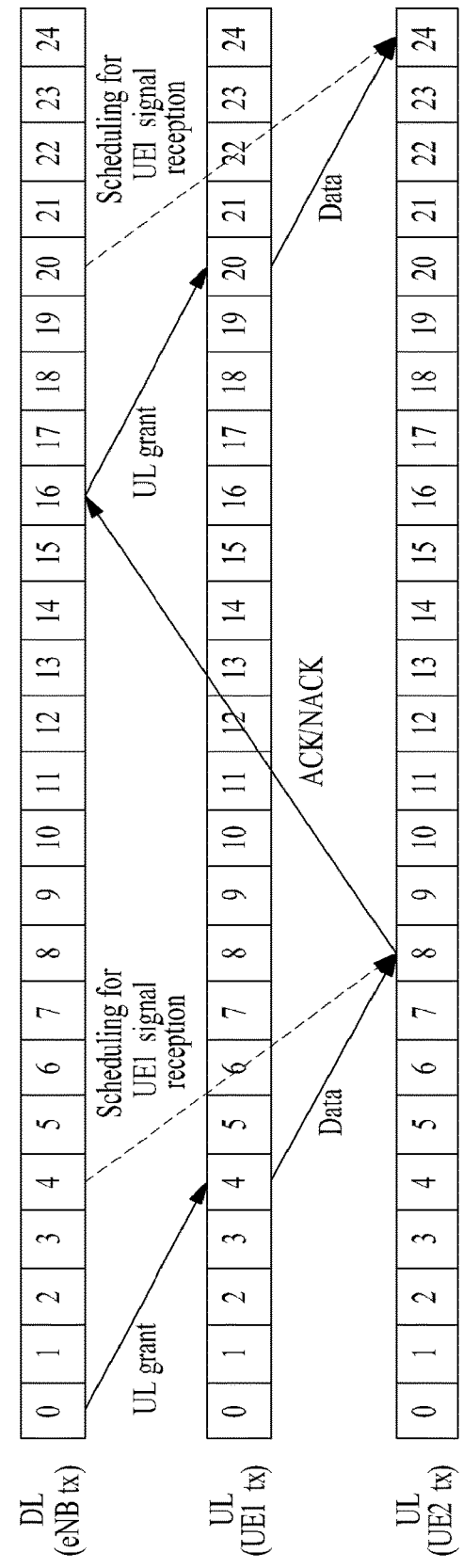
FIGS. 8 to 13 illustrate an HARQ process according to an embodiment of the present invention.

FIG. 8 illustrates a UE-UE HARQ process according to an embodiment of the present invention.

FIG. 8 is different from FIG. 7 in that a time interval between ACK/NACK transmission of the UE2 and UL grant (or PHICH) transmission of an eNB is changed to 8 ms from 4 ms. As a result, an HARQ period of UE-UE communication is 16 ms. Although not illustrated, the eNB may transmit UL grant to the UE1 in subframe #8 so as to manage another UE-UE HARQ process that is performed in parallel to the HARQ process illustrated in FIG. 8. Two HARQ processes for UE-UE communication are managed so as to transmit UL grant in subframes #0, #8, #16, #24, . . . and thus only one UE-eNB HARQ process is limited.

Figure 9:
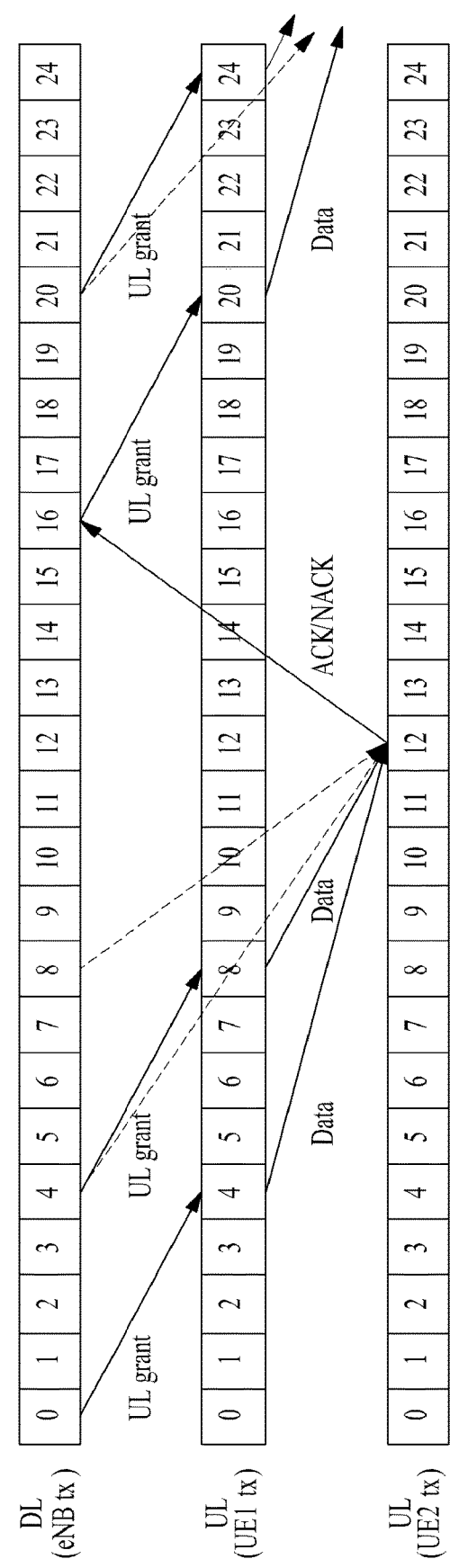

FIG. 9 illustrates a UE-UE HARQ process according to another embodiment of the present invention.

FIG. 9 is different from FIG. 7 in that an eNB transmits two UL grants in subframes #0 and #4 at an interval of 4 ms, the UE1 performs signal transmission for the UL grants in subframes #4 and #8, and the UE2 transmits ACK/NACK for the signals subframes #4 and #8 in subframe #12. In this case, in order to simultaneously transmit ACK/NACK for two signals received in subframes #4 and #8, in subframe #12, multiple ACK/NACK may be transmitted in one subframe in legacy LTE(-A). In detail, ACK/NACK bundling for generating one ACK/NACK may be used through a logical AND operation for ACK/NACK in two subframes. In addition, when a plurality of ACK/NACK resources (e.g., PUCCH format 1b resource) to the UE2 in subframe #12 (e.g., ACK/NACK resource liked with subframe #4 (e.g., ACK/NACK resource liked with a resource index for transmitting scheduling information in subframe #4), and ACK/NACK resource linked with subframe #8), a channel selection method for combining selection of ACK/NACK resource index (e.g., PUCCH resource index) and a modulated value of ACK/NACK signal and transmitting a plurality of ACK/NACK signals. Based on the ACK/NACK signals, the eNB may transmit a signal (e.g., UL grant or PHICH) indicating retransmission of a signal for UL transmit in subframes #0 and #4, in subframes #16 and #20. In this example, a period of a UE-UE HARQ process is 16 ms.

Figure 10:
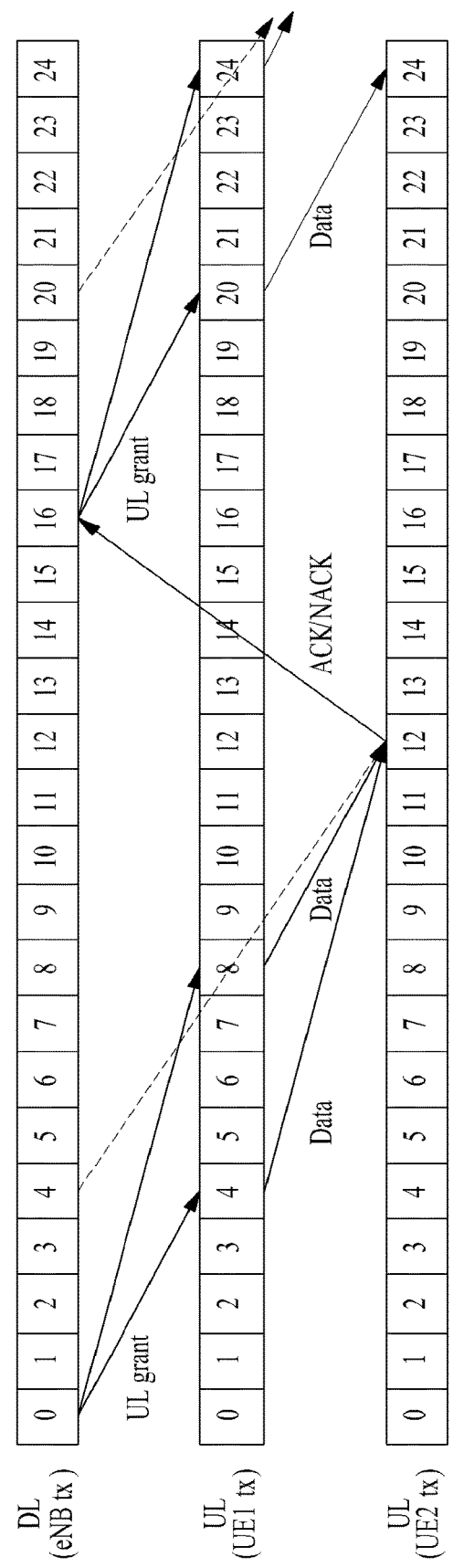
Figure 11:
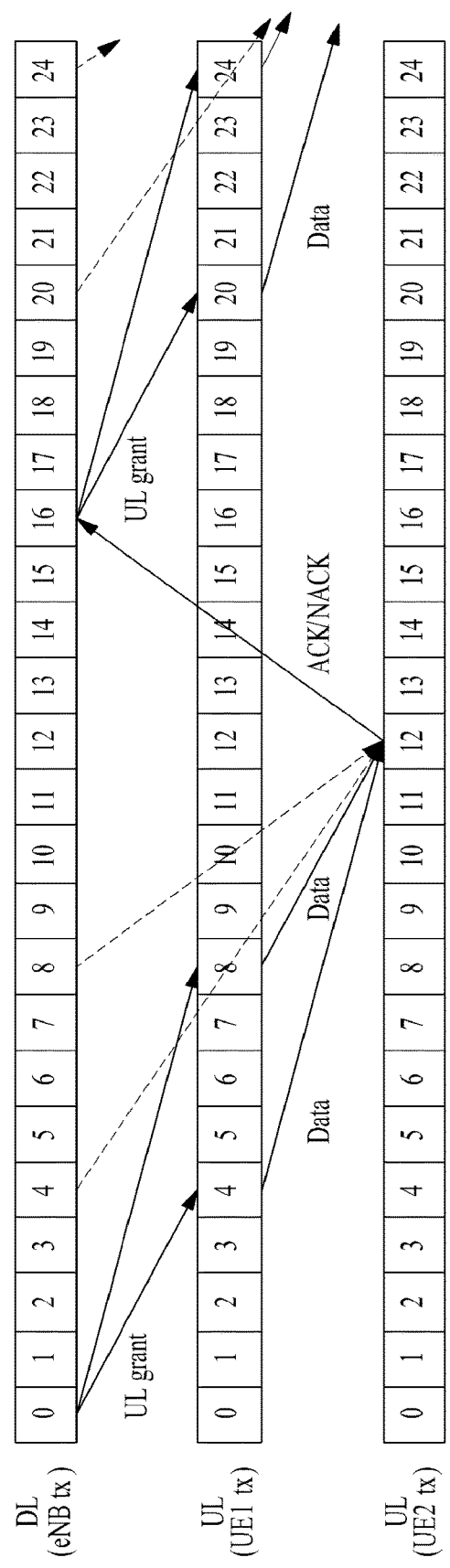

FIGS. 10 and 11 illustrate UE-UE HARQ process according to another embodiment of the present invention.

The method of FIG. 10 is a modified form of FIG. 9. In the method of FIG. 10, transmission of subframes #4 and #8 is scheduled in subframe #0. For example, the eNB may transmit one UL grant and the UE1 may perform (the same) signal transmission in subframes #4 and #8 according to UL grant. In particular, resource allocation in two subframes may be maintained constant but an RV for HARQ may be changed according to a conventional rule. As another example, UL grant that is transmitted by the eNB in subframe #0 may be considered as a special transmission time interval (TTI) formed by bundling two TTIs present in subframes #4 and #8, and the UE1 may operate to transmit a signal to the UE2. As another example, the eNB may transmit two UL grants in subframe #0 and each UL grant may be UL grant for signal transmission in subframes #4 and #8. Simultaneously, the eNB may transmit scheduling information for a signal of the UE1 in subframe #4, and the UE2 may operate to appropriately receive the corresponding signal in subframes #4 and #8.

In addition, as illustrated in FIG. 11, the eNB may transmit scheduling information for a signal of the UE1 to the UE2 in subframes #4 and #8. The UE2 may transmit ACK/NACK for a received signal in subframe #12. As illustrated in FIG. 11, upon receiving scheduling information from the eNB at 4 ms after transmission of ACK/NACK, the UE2 may use ACK/NACK resource linked with corresponding scheduling information (e.g., ACK/NACK resource linked with a resource index (e.g., a minimum control channel element (CCE) index used for transmission of scheduling information) for transmitting scheduling information). In all of the cases of FIGS. 10 and 11, the eNB may schedule new transmission or retransmission (through UL grant or PHICH) for a corresponding HARQ process in subframe #16.

Thus far, the case in which a UE intervenes directly in HARQ of UE-UE link has been described as a method for overcoming the problem in terms of configuration of HARQ period of UE-UE link. Here, direct intervene in HARQ operation of UE-UE link refers to transmission of some or all of HARQ signals of UE-UE link by the eNB. Examples of an HARQ signal includes information about whether data is initially transmitted or is retransmitted, HARQ ACK/NACK signal, a modulation and coding scheme (MCS) indicator applied to data, etc.

Hereinafter, a method in which an eNB does not intervene directly in an HARQ operation of UE-UE link in order to overcome the problem in terms of configuration of HARQ period of UE-UE link will be described.

Figure 12:
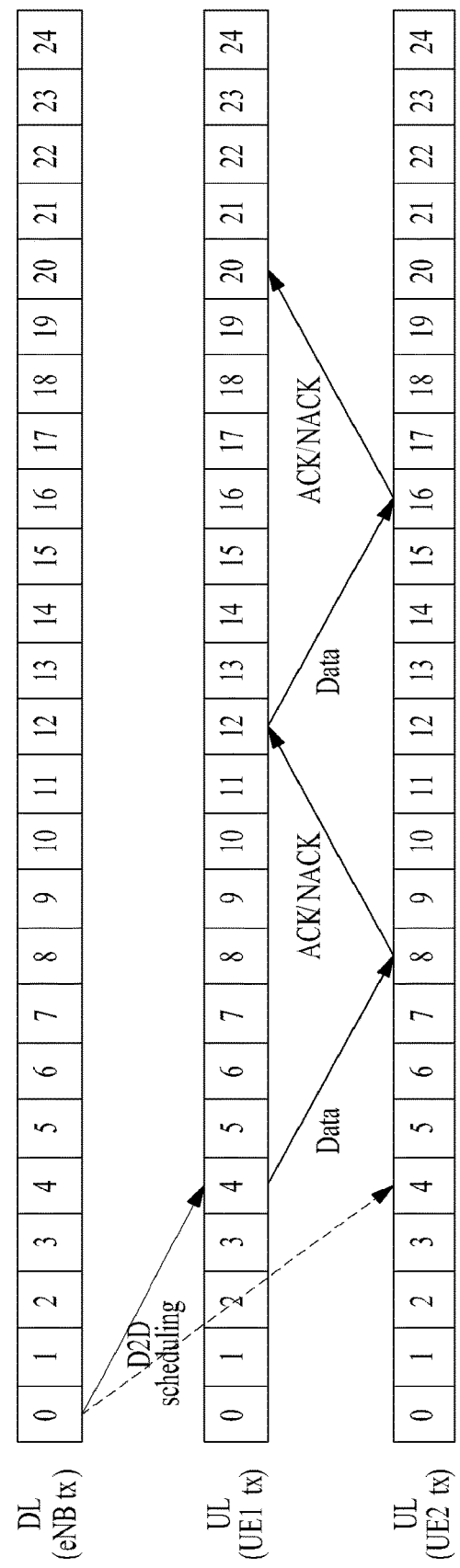

When UE-UE link is executed between adjacent UEs, it may be possible that a plurality of UEs that belong to one eNB simultaneously performs UE-UE communication using the same resource. In this case, when the eNB intervenes directly in all UE-UE links, a scheduler of the eNB may be excessively complex and control signal transmission overhead may be greatly increased. This problem can be overcome by managing the eNB and UEs in such a way that the eNB provides only a basic configuration for operation of UE-UE link (e.g., transmission power or time/frequency resources in which UE-UE link is operated), and a UE determines whether a partial or entire portion of a detailed HARQ operation is performed (e.g., whether retransmission is performed or whether new data is transmitted) and signals corresponding information. In this case, like in the above diagrams, the eNB does not have to transmit HARQ ACK/NACK and/or UL grant for every data transmission. In addition, as illustrated in FIG. 12, an HARQ operation with a period of 8 ms in UE-UE link is possible. Here, this corresponds to the case in which two UEs manage HARQ in UE-eNB link without separate additional intervene of the eNB in appropriate subsequent subframes according to device-to-device (D2D) scheduling message of one number of time in subframe #0. However, in this case, it is disadvantageous in that a position of a subframe for ACK/NACK exchange between UE-UE is limited.

In general, a predetermined period of time is consumed to request a UE to transmit new data or retransmit legacy data and to perform various processes for the transmission and retransmission. In an LTE(-A) system, HARQ timeline is designed assuming that 3 ms is consumed for this processing. As a result, transmission request in subframe #n may be transmitted in subframe #n+4 through a processing process for 3 ms of subframes #n+1, #n+2, and #n+3. After reception of ACK/NACK, the same restriction may also occur for generation of retransmitted data. In order to maintain an HARQ period of 8 ms while ensuring a period of time of 3 ms (in terms of a reception UE) up to ACK/NACK generation after data reception and a period of time 3 ms (in terms of a transmission UE) up to data generation after ACK/NACK reception in UE-UE link, ACK/NACK for UE-UE link data of subframe #n needs to be transmitted in subframe #n+4 as illustrated in FIG. 12. This means that a position of a corresponding subframe, that is, an HARQ process corresponding to the corresponding subframe may be allocated to opposite direction communication of the UE-UE link. For example, when a specific HARQ process is allocated to transmit data to the UE2 by the UE1, an HARQ process after 4 ms may be automatically allocated to transmit data to the UE1 by the UE2.

FIG. 12 illustrates a UE-UE HARQ process according to another embodiment of the present invention.

Referring to FIG. 12, it may be possible that an HARQ period of UE-UE link is configured as 8 ms according to an HARQ period of eNB-UE link without intervene of the eNB, restriction may occur in terms of a communication point of time of both directions of UE-UE link. When one UE manages various UEs and UE-UE link, it may be difficult to satisfy this restriction. For example, in FIG. 12, this is because the UE2 configures UE-UE link with another UE that is not the UE1 in subframes #8 and #16. Accordingly, for more flexibly manage multiple UE-UE link, it may be helpful to increase an HARQ period of UE-UE link, as described with reference to FIGS. 8 to 11. That is, this is because, when the HARQ period of UE-UE link is configured as a multiple of 8 ms, even if a processing time interval is provided between ACK/NACK transmission of data transmission and data retransmission of ACK/NACK transmission, there is a plurality of configurable points of time for transmission of opposite link. In addition, when data is transmitted and received directly through UE-UE link, time delay due to communication between eNBs present in UE-eNB link, etc. is cancelled. Accordingly, even if the HARQ period is increased, time delay of entire data transmission and reception may be problematical.

Figure 13:
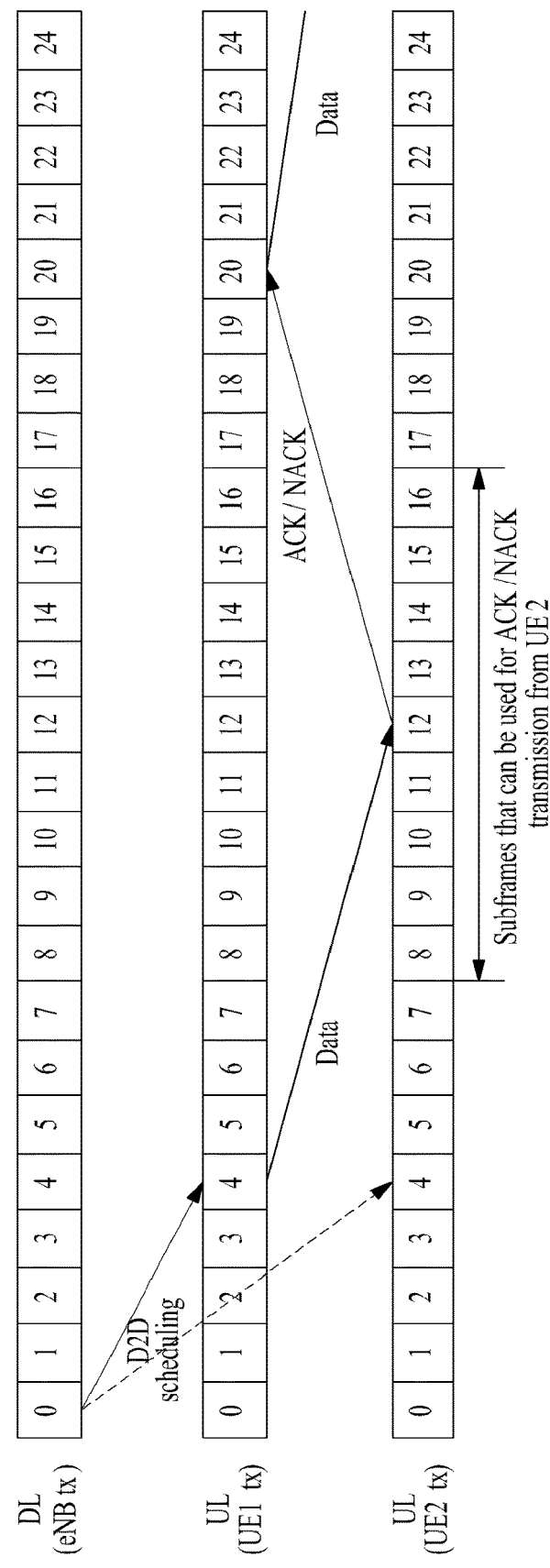

FIG. 13 illustrates a UE-UE HARQ process according to another embodiment of the present invention.

Referring to FIG. 13, when the UE1 transmits data to the UE2 in subframe #4, the UE2 may transmit ACK/NACK after subframe #8 in consideration of processing time of data. In this case, it may be assumed that the UE1 needs to terminate ACK/NACK transmission up to subframe #16 in order to ensure time taken to determine whether retransmission is performed. Accordingly, the UE2 may transmit ACK/NACK to the UE1 using a random subframe (e.g., subframe #12) between subframes #8 to #16. Accordingly, a higher degree of freedom is generated for resource configuration of UE-UE link, and an HARQ period of UE-UE link is doubled to 16 ms compared with eNB-UE link from the UE1 point of view. In FIG. 13, since it is assumed that ACK/NACK is transmitted in subframe #12, it is expected that the UE1 transmits a signal to the UE2 in subframes #4 and #20 and receives a signal from the UE2 in subframe #12. Accordingly, as a UE-UE link operation is performed, an interval of subframes in which restriction occurs in the eNB-UE link operation may be maintained to 8 ms. In particular, it is advantageous in that this configuration can minimize the number of HARQ processes of eNB-UE link that is restricted when UE-UE link is configured. In order to enhance this advantage, ACK/NACK transmission point of time in UE-UE link may be fixed as a point of time (that is, the same point of time contained in eNB-UE HARQ process as a point of time for transmission of data) corresponding to 8 ms after data transmission.

As described above, when an HARQ period of UE-UE link is configured as a multiple of eNB-UE link, the HARQ period of UE-UE link may not have to be limited to two times of an HARQ period of eNB-UE link and may have a general multiple. That is, when the HARQ period of UE-UE link is configured as k times of eNB-UE link, if the UE1 transmits data in subframe #n, the corresponding data may be retransmitted in subframe #n+8k and an ACK/NACK signal may be received in an appropriate subframe therebetween. In this case, this may be interpreted as if an HARQ process of one eNB-UE link is divided and the divided HARQ process is allocated to UE-UE link. k may be a predetermined value or may be signaled by the UE through a higher layer signal such as system information or RRC in consideration of the number of UE-UE links, a degree of time delay, etc.

Thus far, a principle according to the present invention in the case of FDD has been described. However, this is for understanding of the present invention. The principle that an HARQ process of one eNB-UE link is divided into k processes and the divided HARQ processes are allocated to UE-UE link can also be applied to TDD. In the case of LTE(-A) TDD, since the number of UL subframes varies according to UL-DL configuration as shown in Table 1, the number of UL HARQ processes and HARQ round trip time (RTT) are differently configured according to UL-DL configuration. Here, the HARQ RTT may refer to a time interval (e.g., subframe (SF) or unit of ms) up to reception of (corresponding) PHICH from reception of UL grant through (corresponding) PUSCH transmission, or a time interval up to corresponding retransmission from PUSCH transmission. When the UL HARQ RTT is 10 [SFs or ms] (UL-DL configurations #1, #2, #3, #4, and #5), one UL HARQ process uses one fixed UL SF timing. On the other hand, when the UL HARQ RTT is not 10 [SFs or ms] (UL-DL configurations #0 and #6), one UL HARQ process (hops and) uses a plurality of UL SF timings (this are not one fixed UL SF timing).

Table 3 below shows an operation of a UL HARQ process according to UL-DL configuration. Table 3 shows a UL subframe to which transmission of PUSCH requested in a specific DL (or special) subframe is allocated and a DL (or special) subframe in which request for retransmission is received.

TABLE 3

| | SF | UG | UL | PHI | reU | PHI | reU | PHI | reU | PHI | reU | PHI | reU | PHI | reU | PHI | reU |
|---|---|---|---|---|---|---|---|---|---|---|---|---|---|---|---|---|---|
| UL-DL cfg#0 | 2 | 6 | 2 | 6 | 3 | 0 | 4 | 0 | 7 | 1 | 8 | 5 | 9 | 5 | 2 | 6 | 3 |
| | 3 | (6) | 3 | 0 | 4 | 0 | 7 | 1 | 8 | 5 | 9 | 5 | 2 | 6 | 3 | 0 | 4 |
| | 4 | 0 | 4 | 0 | 7 | 1 | 8 | 5 | 9 | 5 | 2 | 6 | 3 | 0 | 4 | 0 | 7 |
| | 7 | 1 | 7 | 1 | 8 | 5 | 9 | 5 | 2 | 6 | 3 | 0 | 4 | 0 | 7 | 1 | 8 |
| | 8 | (1) | 8 | 5 | 9 | 5 | 2 | 6 | 3 | 0 | 4 | 0 | 7 | 1 | 8 | 5 | 9 |
| | 9 | 5 | 9 | 5 | 2 | 6 | 3 | 0 | 4 | 0 | 7 | 1 | 8 | 5 | 9 | 5 | 2 |

| | SF | UG | UL | PHI | reU | PHI | reU | PHI | reU | PHI | reU | PHI | reU | PHI | reU |
|---|---|---|---|---|---|---|---|---|---|---|---|---|---|---|---|
| UL-DL cfg#6 | 2 | 5 | 2 | 6 | 3 | 9 | 4 | 0 | 7 | 1 | 8 | 5 | 2 | 6 | 3 |
| | 3 | 6 | 3 | 9 | 4 | 0 | 7 | 1 | 8 | 5 | 2 | 6 | 3 | 9 | 4 |
| | 4 | 9 | 4 | 0 | 7 | 1 | 8 | 5 | 2 | 6 | 3 | 9 | 4 | 0 | 7 |
| | 7 | 0 | 7 | 1 | 8 | 5 | 2 | 6 | 3 | 9 | 4 | 0 | 7 | 1 | 8 |
| | 8 | 1 | 8 | 5 | 2 | 6 | 3 | 9 | 4 | 0 | 7 | 1 | 8 | | |

| | SF | UG | UL | PHI | reU | PHI |
|---|---|---|---|---|---|---|
| UL-DL cfg#1 | 2 | 6 | 2 | 6 | 2 | 6 |
| | 3 | 9 | 3 | 9 | 3 | 9 |
| | 7 | 1 | 7 | 1 | 7 | 1 |
| | 8 | 4 | 8 | 4 | 8 | 4 |
| UL-DL cfg#2 | 2 | 8 | 2 | 8 | 2 | 8 |
| | 7 | 3 | 7 | 3 | 7 | 3 |
| UL-DL cfg#3 | 2 | 8 | 2 | 8 | 2 | 8 |
| | 3 | 9 | 3 | 9 | 3 | 9 |
| | 4 | 0 | 4 | 0 | 4 | 0 |
| UL-DL cfg#4 | 2 | 8 | 2 | 8 | 2 | 8 |
| | 3 | 9 | 3 | 9 | 3 | 9 |
| UL-DL cfg#5 | 2 | 8 | 2 | 8 | 2 | 8 |

Here, UL-DL cfg represents UL-DL configurations, SF represents a UL subframe index in a radio frame, UG represents UL grant, UL represents UL transmission (e.g., PUSCH transmission), PHI represents PHICH (or UL grant), and reU represents UL retransmission. The number of SF, UL, and reU represents a UL subframe index in a radio frame, and the number of UG and PHI represents a DL subframe index in a radio frame.

Referring to Table 3 above, for example, in the case of UL-DL configuration #0, when UL grant is received in subframe #6, PUSCH transmission is performed in subframe #12, retransmission request (e.g., PHICH) is received in subframe #16, and PUSCH retransmission is performed in subframe #23. In terms of only PUSCH transmission point of time, subframe #2 of radio frame #m, subframe #3 of radio frame #m+1, subframe #4 of radio frame #m+2, subframe #7 of radio frame #m+3, subframe #8 of radio frame #m+4, subframe #9 of radio frame #m+5, and subframe #2 of radio frame #m+6 may be used.

In an LTE(-A) TDD system, one of eNB-UE HARQ processes shown in Table 3 may also be divided into k processes and the divided processes may be allocated. For example, according to one of the two divided processes, data transmission of UE-UE link may be performed in an order of subframe #2 of radio frame #m, subframe #4 of radio frame #m+2, subframe #8 of radio frame #m+4, and subframe #2 of radio frame #m+6. On the other hand, according to another one of the two divided processes, data transmission of UE-UE link may be performed in an order of subframe #3 of radio frame #m+1, subframe #7 of radio frame #m+3, subframe #9 of radio frame #m+5, and subframe #3 of radio frame #m+7.

Figure 14:
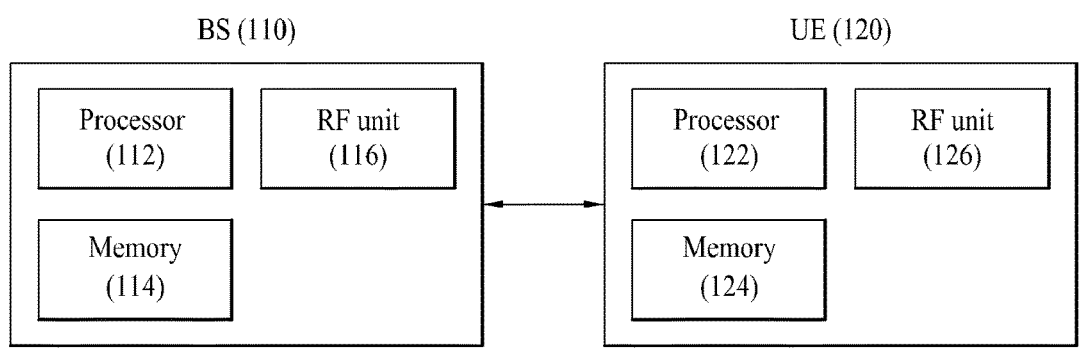
FIG. 14 illustrates an example of a BS and a UE that are applicable to embodiments of the present invention.

FIG. 14 illustrates an example of a BS and a UE that are applicable to embodiments of the present invention. In the case of a system including a relay, a BS or a UE may be replaced with the relay. In UE-UE link, the illustrated eNB-UE may be replaced with UE-UE.

Referring to FIG. 14, a wireless communication system includes a BS 110 and a UE 120. The BS 110 includes a processor 112, a memory 114, and a radio frequency (RF) unit 116. The processor 112 may be configured to embody the procedures and/or methods proposed by the present invention. The 114 is connected to the processor 112 and stores various information related to an operation of the processor 112. The RF unit 116 is connected to the processor 112 and transmits/receives a radio signal. The UE 120 includes a processor 122, a memory 124, and an RF unit 126. The processor 122 may be configured to embody the procedures and/or methods proposed by the present invention. The memory 124 is connected to the processor 122 and stores various information related to an operation of the processor 122. The RF unit 126 is connected to the processor 122 and transmits/receives a radio signal. The BS 110 and/or the 120 may include a single antenna or multiple antennas.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary. It is obvious to those skilled in the art that claims that are not explicitly cited in each other in the appended claims may be presented in combination as an embodiment of the present invention or included as a new claim by a subsequent amendment after the application is filed.

The embodiments of the present invention are disclosed on the basis of a data communication relationship between a base station and a terminal. Specific operations to be conducted by the base station in the present invention may also be conducted by an upper node of the base station as necessary. In other words, it will be obvious to those skilled in the art that various operations for enabling the base station to communicate with the terminal in a network composed of several network nodes including the base station will be conducted by the base station or other network nodes other than the base station. The term "base station (BS)" may be replaced with a fixed station, Node-B, eNode-B (eNB), or an access point as necessary. The term "relay" may be replaced with the terms relay node (RN) or relay station (RS). The term "terminal" may also be replaced with a user equipment (UE), a mobile station (MS), or a mobile subscriber station (MSS).

The embodiments of the present invention may be achieved by various means, for example, hardware, firmware, software, or a combination thereof. In a hardware configuration, an embodiment of the present invention may be achieved by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to a wireless communication apparatus such as a user equipment (UE), a relay, an eNB, etc.

The invention claimed is:

1. A method for a first user equipment (UE) to perform UE-to-UE communication in a wireless communication system, the method comprising:
   receiving control information including resource allocation used for the UE-to-UE communication from a base station (BS); and
   transmitting data based on the control information to a second UE in a set of non-consecutive time units,
   wherein a time interval between the non-consecutive time units is a multiple of a UE-to-BS hybrid automatic repeat request (HARQ) period.

2. The method of claim 1, wherein the multiple is greater than or equal to 2.

3. The method of claim 1, wherein the set of non-consecutive time units consists of UL time units.

4. The method of claim 1, wherein the UE-to-BS HARQ period is an uplink (UL) HARQ period defined for UE-to-BS communication.

5. The method of claim 1, wherein the UE-to-BS HARQ period is 8 time units for frequency division duplex (FDD).

6. The method of claim 1,
wherein the UE-to-BS HARQ period is 11 time units for time division duplex (TDD) uplink-downlink (UL-DL) configurations #0 and #6, and 10 time units for TDD UL-DL configurations #1 to #5, and
wherein the time units are configured according to TDD UL-DL configurations as follows:

| TDD UL-DL configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D | where D denotes a DL subframe, U denotes a UL subframe and S denotes a special subframe.

7. The method of claim 1, wherein the time unit includes a plurality of contiguous orthogonal frequency division multiplexing (OFDM)-based symbols.

8. The method of claim 1, wherein the time unit includes a subframe.

9. A first user equipment (UE) configured to perform UE-to-UE communication in a wireless communication system, the first UE comprising:
a transceiver; and
a processor, operatively coupled to the transceiver, wherein the processor is configured to:
control the transceiver to receive control information including resource allocation used for the UE-to-UE communication from a base station (BS), and
control the transceiver to transmit data based on the control information to a second UE in a set of non-consecutive time units,
wherein a time interval between the non-consecutive time units is a multiple of a UE-to-BS hybrid automatic repeat request (HARQ) period.

10. The first UE of claim 9, wherein the multiple is greater than or equal to 2.

11. The first UE of claim 9, wherein the set of non-consecutive time units consists of UL time units.

12. The first UE of claim 9, wherein the UE-to-BS HARQ period is an uplink (UL) HARQ period defined for UE-to-BS communication.

13. The first UE of claim 9, wherein the UE-to-BS HARQ period is 8 time units for a frequency division duplex (FDD).

14. The first UE of claim 9,
wherein the UE-to-BS HARQ period is 11 time units for time division duplex (TDD) uplink-downlink (UL-DL) configurations #0 and #6, and 10 time units for TDD UL-DL configurations #1 to #5, and
wherein the time units are configured according to TDD UL-DL configurations as follows:

| TDD UL-DL configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D | where D denotes a DL subframe, U denotes a UL subframe and S denotes a special subframe.

15. The first UE of claim 9, wherein the time unit includes a plurality of contiguous symbols.

16. The first UE of claim 9, wherein the time unit includes a subframe.

* * * * *